United States Patent Office 3,030,258
Patented Apr. 17, 1962

3,030,258
DRY CEMENT COMPOSITION COMPRISING PORTLAND CEMENT, METHYL CELLULOSE, AND POLYVINYL ALCOHOL, AND METHOD OF INSTALLING TILE WITH SAME
Herman B. Wagner, Perkasie, Pa., assignor to Tile Council of America, Incorporated, a corporation of New York
No Drawing. Filed May 28, 1958, Ser. No. 738,279
8 Claims. (Cl. 156—71)

This invention relates to improved hydraulic cement compositions and particuarlry to mortars, paints, stucco, plaster and material for patching roads. The invention also relates to methods of using these compositions and to methods of preparing them.

As an important example, certain advantages are derived by the practice of this invention in connection with Portland cement mortar compositions. Conventional mortars generally consist of mixtures of Portland cement, lime, and sand. Water is added to this mixture to obtain workability and to take part in the gel formation by means of which the cement hardens. Conventional Portland cement mortars have high bond strengths when properly installed, non-flammability, permanence, high water-resistance, and immunity to rodent, insect, and fungi attack.

Conventional Portland cement mortars have certain disadvantages as well as advantages. Such mortars are not entirely self-curing in that they tend to lose considerable water by evaporation into the air and also by absorption into the tile or masonry which is being set. If the water loss is too great, the curing action is incomplete and the mortar becomes soft and chalky. Very wet conditions must be maintained for proper hardening and bonding of conventional Portland cement compositions; this has necessitated the troublesome operation of soaking all non-vitreous ceramic tile before setting and has required considerable precautions to be taken to provide thoroughly wet conditions on the substrate over which the mortar is placed and in the atmosphere surrounding the tiled area during the period of curing. Furthermore, because of the necessity for maintaining such very wet conditions and also because of the great bulk of the materials associated with a conventional Portland cement-ceramic tile installation, it has been often impossible or impractical to use such mortars over such substrates as gypsum wallboard or plaster. Another disadvantage of conventional mortars is that, although under optimum conditions they can form strong bonds to masonry, tile and other surfaces, optimum conditions are seldom present and, under conditions prevalent in the usual installation, bonding may be poor. Slight movements, for example, such as those inherent in the shrinkage that occurs during the curing, or vibrations caused by external disturbances, can completely destroy the bond.

One object of the present invention is to provide improved hydraulic cement compositions.

Another object of the invention is to provide dry-setting hydraulic cement compositions which do not lose substantial amounts of water to their surroundings during the curing stages.

Still another object of the invention is to provide an improved mortar which forms strong bonds to masonry, tile, wallboard and many other types of surfaces under widely varying conditions of installation.

Still another object of the invention is to provide an improved paint having Portland cement as a principal ingredient.

A further object of the invention is to provide improved methods of setting ceramic tile.

According to this invention means are provided for preventing the loss of water from hydraulic cement compositions to a dry backing base, or to the absorptive back of dry tile pressed into contact with the composition. This water retentive property is obtained by causing the viscosity of the liquid phase obtained upon water addition to the compositions to be sufficiently high so that no egress of the water to tile or subtrate will occur, or so that the rate of such water loss is greatly diminished. For the purpose of providing to the water phase such increased viscosity, and at the same time allowing of effective concomitant use with Portland cement, certain viscosity types of methyl cellulose and certain grades of polyvinyl alcohol in proper amounts are mixed with the hydraulic cement composition. The composition may also include other ingredients such as hardening accelerators like calcium chloride, whiteners and other pigments such as titanium dioxide, sand, and anti-shrinking agents such as aluminum metal. Dispersing agents such as calcium lignosulfonate to reduce water requirement and antifoam agents such as the silicone emulsion polymers or ionic siliconates may be used. Asbestos or other fiber is added to reduce sagging tendencies of the mortar when leveled on vertical surfaces in layers of thicknesses from ¼ inch to ½ inch. The amount of asbestos fiber may vary from about 0.05 to 10%, based on the weight of the composition.

A minimum water-phase viscosity in the compositions of about 500 centipoises is provided in order to obtain the degree of water retentivity required.

Examples of the improved mortar compositions of the present invention and of the improved techniques for using them will now be given. The viscosity of the methyl cellulose is given in terms of a 2% aqueous solution. In all of the following examples percentages of all ingredients are based on the weight of the composition before water is added.

Example 1

|  | Percent |
|---|---|
| Portland cement | 96.59 |
| Methyl cellulose (4000 centipoises) | 1.20 |
| Polyvinyl alcohol (86% to 89% hydrolyzed) | 0.31 |
| Asbestos fiber | 1.70 |
| Urea | 0.20 |

Mix with 35% to 37% of its weight of water.

Methyl cellulose usable in the mortar compositions of the invention may vary in viscosity from about 10 to 7000 centipoises, measured in 2% aqueous solution and the amount may be varied from about 0.20% to about 6.5%. In general, the highest viscosity grades may be used in the smallest percentage amounts and the lowest viscosity grades may be used in the largest amounts within the range specified.

Example 2

|  | Percent |
|---|---|
| Portland cement | 93.19 |
| Methyl cellulose (10 centipoises) | 6.50 |
| Polyvinyl alcohol (86% to 89% hydrolyzed) | 0.31 |

Mix with 35% of its weight of water.

Example 3

|  | Percent |
|---|---|
| Portland cement | 99.45 |
| Methyl cellulose (7000 centipoises) | 0.24 |
| Polyvinyl alcohol (86% to 89% hydrolyzed) | 0.31 |

Mix with 33% of its weight of water.

Example 4

|  | Percent |
|---|---|
| Portland cement | 98.99 |
| Methyl cellulose (400 centipoises) | 0.70 |
| Polyvinyl alcohol (86% to 89% hydrolyzed) | 0.31 |

Mix with 33% of its weight of water.

Hydraulic cements as used in the description of the invention may be defined as a cement that hardens under water, or by reaction with water. Typical examples are: Portland cement, high alumina cement, pozzolana cement, and iron-ore or slag cement.

Example 5

| | Percent |
|---|---|
| Aluminum silicate cement (aluminous cement) | 98.49 |
| Methyl cellulose (4000 centipoises) | 1.20 |
| Polyvinyl alcohol (86% to 89% hydrolyzed) | 0.31 |

Mix with 33% of its weight of water.

The polyvinyl alcohol must be cold water soluble and not too highly hydrolyzed. From this standpoint the polyvinyl alcohol must be of grade approximately 70% to 90% hydrolyzed.

Example 6

| | Percent |
|---|---|
| Portland cement | 98.70 |
| Methyl cellulose (4000 centipoises) | 1.20 |
| Polyvinyl alcohol (73% to 77% hydrolyzed) | 0.10 |

Mixed with 33% of its weight with water.

Example 7

| | Percent |
|---|---|
| Portland cement | 93.30 |
| Methyl cellulose (4000 centipoises) | 1.20 |
| Polyvinyl alcohol (86% to 89% hydrolyzed) | 1.50 |

Mixed with 34% of its weight with water. This composition gives an extended working time.

Powdered limestone can be used in amounts up to about 45% with particular advantages found in the range from about 10% to about 45%. When limestone is used, the proportion of water is usually varied from about 27% to about 40%, the optimum in most cases being about 33%.

Example 8

| | Percent |
|---|---|
| Portland cement | 80.49 |
| Powdered limestone | 18.00 |
| Methyl cellulose (4000 centipoises) | 1.20 |
| Polyvinyl alcohol (79% to 82% hydrolyzed) | .31 |

Mix with 33% of its weight of water.

Sand can be used in amounts up to 75% of the dry mortar weight. When sand is used, the percentage of water may vary from about 20% to about 40% of dry mortar weight, the optimum being usually around 24% when the larger proportions of sand are used.

Example 9

| | Percent |
|---|---|
| Portland cement | 31.49 |
| Fine dry sand | 59.00 |
| Powdered limestone | 8.00 |
| Methyl cellulose (4000 centipoises) | 1.20 |
| Polyvinyl alcohol (86% to 89% hydrolyzed) | .31 |

Mix with 22% of its weight of water.

Example 10

| | Percent |
|---|---|
| Portland cement | 32.81 |
| Sand | 66.00 |
| Methyl cellulose (400 centipoises) | .88 |
| Polyvinyl alcohol (86% to 89% hydrolyzed) | .31 |

Mix with 20% of its weight of water.

In utilizing improved mortar compositions in accordance with the present invention, it is desirable to be able to make up the proper mixes "on the job," particularly where the mortars are being used for large scale installations. However, it has been found that it is not practical to use the usual mixing equipment commonly employed by masons and contractors in trying to get a satisfactory blend of Portland cement, sand or powdered limestone, methyl cellulose and polyvinyl alcohol, since the methyl cellulose and polyvinyl alcohol cannot be distributed throughout the mix with sufficient uniformity for good results. In fact, it is not even possible to get a satisfactory blend of just the cement and the methyl cellulose and polyvinyl alcohol with ordinary mixing equipment in a brief time.

Accordingly, another feature of the present invention is the provision of a methyl cellulose, polyvinyl alcohol, limestone, or Portland cement concentrate which can be pre-blended with "factory" mixing equipment and a portion of this concentrate easily and satisfactorily blended with the proper amount of Portland cement and/or aggregate to make up the desired mortar on the job site with ordinary mixing equipment in the ratio of 2.5 parts by weight of the concentrate to 9.4 parts by weight of the Portland cement. The complete mixture was then mixed into 30% of its weight of water, and provided mortar capable of thin-setting ceramic tile.

Urea may be used in an amount of from about 0.2% to about 1.5% by weight, with the preferred range being 0.35% to 1.0%. As the percentage of urea is increased up to the maximum stated, the temperature at which the methyl cellulose will gel properly is increased, the upper temperature limit of use being about 125 degrees F.

Example 11

| | Percent |
|---|---|
| Portland cement | 97.80 |
| Methyl cellulose (4000 centipoises) | 1.35 |
| Polyvinyl alcohol (86% to 89% hydrolyzed) | 0.30 |
| Urea | 0.55 |

Mix with 33% of its weight of water.

Other additive substances, having the same effect as urea, in the compositions of the present invention are inorganic thiocyanates. Suitable inorganic thiocyanates are these of the alkali metals, for example, sodium, potassium, lithium or cesium, and of the alkaline earth metals, for example, barium, calcium, strontium or magnesium. Some examples of mortar compositions utilizing this type of additive are as follows:

Example 12

| | Percent |
|---|---|
| Portland cement | 97.90 |
| Methyl cellulose (4000 centipoises) | 1.30 |
| Sodium thiocyanate | 0.50 |
| Polyvinyl alcohol (86% to 89% hydrolyzed) | .30 |

Mixed with 35% of its weight of water, this provided a mortar having about the same properties as that of Example 11. It could be used effectively at temperatures as high as 110 degrees F. to 115 degrees F.

Example 13

| | Percent |
|---|---|
| Portland cement | 97.80 |
| Methyl cellulose (400 centipoises) | 1.30 |
| Potassium thiocyanate | 0.60 |
| Polyvinyl alcohol (86% to 89% hydrolyzed) | 0.30 | was mixed with 35% of its weight of water and provided a mortar that could be used effectively at temperatures up to 105–110 degrees F.

The range of effective use of the thiocyanates in these mortar compositions is about 0.2% to about 1.2% by weight.

Although most dissolved materials, such as calcium chloride, sodium sulfate, sodium chloride, etc., further lower the temperature at which methyl cellulose can gel properly, urea and the inorganic thiocyanates raise the gelation temperature. Unlike strongly hydrated materials or ions, such as calcium or zinc ions, for example, which bind water very strongly to themselves, the thiocyanate ion and urea increase the availability of water to the methyl cellulose.

There have been described improved hydraulic cement mortars for setting vitreous or non-vitreous tile, laying masonry blocks, and many other applications. These mortars have the advantages of being both thin-setting and dry-setting and of being usable over such substrates as gypsum wallboard, all of which properties are not found with ordinary cement mortars.

The incorporation of methyl cellulose, polyvinyl alcohol and certain other ingredients in cement mortar compositions in specified proportions and the use of such compositions according to certain techniques makes possible new and useful installation methods, and provides the following advantages: a considerable saving in material and labor is effected; at the same time the customary non-flammability, strength, and durability of conventional hydraulic cement mortars is retained; sagging of such mortars on vertical surfaces is prevented; use at higher than ordinary room temperatures is made possible; thin layers of mortar can be effectively employed in place of conventional heavy mortar layers, in many instances a single thin layer of less than ⅛″ thickness; furthermore, no wetting of the tile is required before setting, nor any wetting of the substrate before placement of the mortar layer. Extended working time is also provided by these compositions so that mixing of new batches is required less frequently than with conventional Portland cement, and in general the result is bond strength well in excess of those attainable with conventional Portland cement installation.

The composition and techniques allow of use over such water sensitive or less firm substrates as gypsum wallboard or plaster where hitherto hydraulic cement compositions could not be employed; use of a thin layer of such a mortar over a conventional mortar as a "skim coat" to which a non-vitreous tile will subsequently adhere; use of a thin layer of such compositions for setting paper mounted vitreous or non-vitreous tile whereby such compositions are spread on the tile sheet to be then placed without rupture of the paper to the tile bond.

The following additional examples illustrate the use of the present invention for paints, stuccoes and road patching:

*Example 14*

| | Percent |
|---|---|
| Portland cement | 86.9 |
| Methyl cellulose (400 centipoises) | 2.1 |
| Polyvinyl alcohol (86% to 89% hydrolyzed) | 1.0 |

When mixed with 50% to 60% water this provides a paint for application over any dry porous substrate such as old concrete, brick, or cinder block. No wetting down of the substrate is required before application and a cure superior to that obtainable when ordinary Portland cement is used is obtained.

*Example 15*

| | Percent |
|---|---|
| Portland cement | 50.0 |
| Methyl cellulose (4000 centipoises) | 1.2 |
| Polyvinyl alcohol (86% to 89% hydrolyzed) | 0.5 |
| Whiting | 38.3 |
| Titanium dioxide | 10.0 |

Mix with 60% to 65% water. This gives a paint for use over dry porous substrates and with greater whiteness and hiding than the preceding composition.

*Example 16*

| | Percent |
|---|---|
| Portland cement | 35.0 |
| Fine sand | 63.5 |
| Methyl cellulose (4000 centipoises) | 1.0 |
| Polyvinyl alcohol (86% to 89% hydrolyzed) | 0.5 |

Mix with 20% by weight of water. This gives a cement stucco improved over conventional compositions in that it may be applied over dry-walls and does not require the subsequent damp cure or wetting down that is necessary with conventional stucco compositions. Features of this stucco composition as compared to straight Portland cement stucco include better bonding to the back up wall, less tendency to crack from structural movement and less tendency to crack from drying shrinkage.

*Example 17*

| | Percent |
|---|---|
| Portland cement | 31.0 |
| Coarse sand | 67.6 |
| Methyl cellulose (4000 centipoises) | 1.1 |
| Polyvinyl alcohol (86% to 89% hydrolyzed) | 0.3 |

This composition, mixed with 18% of its weight of water gives a material suitable for repairing or patching pits and crevices that have occurred following use or weathering of concrete highways, sidewalks, floors, and the like. Ordinary Portland cement compositions do not adhere well to old concrete surfaces and have required the use of intervening bonding membranes, coatings, or surface treatment of the old concrete surface. This composition and compositions similar to the one cited in the Example 17 gives good bonding to the older concrete surface and hardens without the necessity of wet-curing conditions, to give a strong coherent patch. One variation of the above particularly appropriate to concrete work contains gravel and/or heavier aggregate in place of or in addition to sand.

Although it is not intended to so limit the invention, the following ranges of ingredients are suggested.

In paint:
  Portland cement _____ 20% to 95%.
  Fillers and pigments _____ 0% to 50%.
  Methyl cellulose _____ 1.0% to 6.0%.
  Polyvinyl alcohol _____ 0.5% to 6.0%.
  Water _____ 50% to 150% of weight of dry ingredients.

Paints applied by brush use the lower part of the water content range. Paints applied by the spray process use the higher water content.

In stucco:
  Portland cement _____ 20% to 50%.
  Sand/limestone _____ 50% to 75%.
  Methyl cellulose _____ 0.5% to 6.0%.
  Polyvinyl alcohol _____ 0.5% to 6.0%.
  Water _____ 20% to 30% of weight of dry ingredients.

In road patching:
  Portland cement _____ 30% to 50%.
  Sand/gravel/aggregate ____ 70% to 50%.
  Methyl cellulose _____ 0.5% to 6.0%.
  Polyvinyl alcohol _____ 0.5% to 6.0%.
  Water _____ 18% to 30% of weight of dry ingredients.

This application is a continuation-in-part of my co-pending applications Ser. No. 547,026, filed November 15, 1955, and now U.S. Patent 2,838,411, granted June 10, 1958; Ser. No. 686,848, filed September 30, 1957, and now U.S. Patent 2,934,932, granted May 3, 1960; Ser. No. 695,552, filed November 12, 1957, and now U.S. Patent 2,959,489, granted November 8, 1960; all of which applications were in turn co-pending with my application Ser. No. 568,992, filed March 2, 1956, and now U.S. Patent 2,820,713, granted January 21, 1958.

Having thus described the invention, what is claimed is:

1. A dry cement composition adapted to be mixed with water which comprises, based on the total weight of the composition, 20 to 99.45% hydraulic cement, 0.2 to 6.5% methyl cellulose of 10 to 7000 centipoises viscosity grade in 2% solution and 0.1 to 10% polyvinyl alcohol of 70 to 90% hydrolyzed grade.

2. A dry cement composition adapted to be mixed with water which comprises, based on the total weight of the composition, 20 to 99.45 percent hydraulic cement, 0.2 to 6.5 percent methyl cellulose of 10 to 7000 centipoise viscosity grade in 2 percent solution, 0.1 to 10 percent polyvinyl alcohol of 70 to 90 percent hydrolyzed grade, and 0.20 to 1.2 percent of a nitrogen compound selected from the group consisting of urea and an inorganic thiocyanate.

3. The dry composition of claim 2 which includes an inert aggregate, selected from the group consisting of sand, limestone, and mixtures of the foregoing.

4. A dry composition adapted to be mixed with water to form a mortar suitable for bonding ceramic tile which consists essentially of, based on the total weight of the composition, 20 to 99.45 percent hydraulic cement, 0.2 to 6.5 percent methyl cellulose of 10 to 7000 centipoise viscosity grade in 2 percent solution; and 0.1 to 10 percent polyvinyl alcohol of 70 to 90 percent hydrolyzed grade.

5. The dry composition of claim 4 which includes an inert aggregate.

6. The dry composition of claim 4 wherein there is included, based on the weight of the dry composition, 0.05 to 10 percent asbestos fiber.

7. The dry composition of claim 4 which includes up to 50 percent by weight of the dry composition of a filler.

8. A method of installing ceramic tile which comprises preparing a mortar by mixing water with a dry composition comprising, based upon the weight of the dry composition, 20 to 99.45% hydraulic cement, 0.2 to 6.5% methyl cellulose of 10 to 7,000 cp. grade in 2% aqueous solution, and 0.1% to 10% polyvinyl alcohol of 70 to 90% hydrolyzed grade, covering a substrate with a bed of said mortar and pressing dry tile into the resulting bed without previous water soaking of the tile.

References Cited in the file of this patent

UNITED STATES PATENTS

| | | |
|---|---|---|
| 1,995,412 | Batchellor | Mar. 26, 1935 |
| 2,388,600 | Collins | Nov. 6, 1945 |
| 2,427,683 | Ludwig | Sept. 23, 1947 |
| 2,600,018 | Nelson et al. | June 10, 1952 |
| 2,725,226 | Shea | Nov. 29, 1955 |
| 2,758,033 | Burney et al. | Aug. 7, 1956 |
| 2,779,417 | Clark et al. | Jan. 29, 1957 |
| 2,820,713 | Wagner | Jan. 21, 1958 |

FOREIGN PATENTS

| | | |
|---|---|---|
| 166,556 | Australia | Jan. 16, 1958 |

UNITED STATES PATENT OFFICE
CERTIFICATE OF CORRECTION

Patent No. 3,030,258                               April 17, 1962

Herman B. Wagner

It is hereby certified that error appears in the above numbered patent requiring correction and that the said Letters Patent should read as corrected below.

Column 1, line 12, for "particuarlry" read -- particularly --; column 5, line 41, for "86.9" read -- 96.9 --.

Signed and sealed this 18th day of September 1962.

(SEAL)
Attest:

ERNEST W. SWIDER                            DAVID L. LADD

Attesting Officer                         Commissioner of Patents